April 30, 1963 R. K. POTTLE 3,087,393
MACHINE AND METHOD FOR MANUFACTURING FIBROUS CONTAINER BODIES
Filed April 4, 1960 8 Sheets-Sheet 3

INVENTOR.
RALPH KENNICOTT POTTLE
BY
George P. Ziehmer Jr.
AGENT

INVENTOR.
RALPH KENNICOTT POTTLE
BY
George P. Ziehmer Jr.
AGENT

April 30, 1963 R. K. POTTLE 3,087,393
MACHINE AND METHOD FOR MANUFACTURING FIBROUS CONTAINER BODIES
Filed April 4, 1960 8 Sheets-Sheet 6

INVENTOR.
RALPH KENNICOTT POTTLE
BY
George P. Ziehmer Jr.
AGENT

April 30, 1963 R. K. POTTLE 3,087,393
MACHINE AND METHOD FOR MANUFACTURING FIBROUS CONTAINER BODIES
Filed April 4, 1960 8 Sheets-Sheet 8

INVENTOR.
RALPH KENNICOTT POTTLE
BY
George P. Ziehmer Jr.
AGENT

United States Patent Office 3,087,393
Patented Apr. 30, 1963

3,087,393
MACHINE AND METHOD FOR MANUFACTURING
FIBROUS CONTAINER BODIES
Ralph Kennicott Pottle, Georgetown, Conn., assignor to
American Can Company, New York, N.Y., a corporation of New Jersey
Filed Apr. 4, 1960, Ser. No. 19,872
15 Claims. (Cl. 93—94)

The present invention relates to a machine for and method of manufacturing fibrous containers and has particular reference to a machine and method for manufacturing spirally wound pull string container bodies.

A recent development in the packaging field has been the introduction of an easily opened container which comprises a spirally wound, multi-ply labelled fibrous body closed at both ends by crimped-on metal closures. To facilitate opening of the container, it is provided with a pull string which is carried on the inside of one of the body plies and extends spirally around the body from its top to its bottom end, one end of this pull string passing through the body ply and projecting from the outside of the container body so that it may be easily grasped by the consumer and pulled, thus tearing through the body ply and so weakening the body wall that the container can thereafter be easily opened by manually applied twisting pressure.

The construction of such container is disclosed in a copending United States application for patent, Serial No. 729,366 which was filed April 18, 1958 in the names of Ralph K. Pottle and William B. Elam and is owned by the instant assignee now Patent No. 3,021,047 dated Feb. 13, 1962.

In the manufacture of the fibrous bodies for such containers, the several plies of body stock are fed in web form to a spiral winding machine which wraps them around a cylindrical mandrel to form them into an endless tube. As it leaves the mandrel, this tube is cut into individual bodies, or alternatively, into lengths containing several such bodies, by an automatic cutting device which is mounted adjacent the end of the mandrel. The method of automatically cutting a labelled spirally wound body is disclosed in United States Patents Re. 23,899 and 2,737,091 which were granted to Ernest B. Robinson. However, no one has heretofore succeeded in providing a body formed in this manner with a pull string having a free end which dangles from the outside of each body.

The present invention provides a machine and method which makes this possible by securing individual pull strings in position on one of the body webs prior to the time the web is wound into the endless tube, each such pull string being provided with a free end which extends through the web and dangles from its opposite surface and is so located in the web that when the individual bodies are cut from the endless tube, the free end of each such pull string is disposed in a specified location adjacent an end of the body so that when grasped and pulled by the consumer, a spiral tear is formed in the body which extends for a major portion of its length.

In carrying out the method steps of the instant invention, the web is fed horizontally through the machine by a plurality of sets of paired feed rollers which operate intermittently through a carefully controlled arc of rotation so that the length of the web fed in each feeding cycle corresponds to the length included in a finished container body. Thus, a potential body blank length of web stock is fed by these feed rollers during each cycle of the web feeding mechanism.

As thus advanced, the web passes beneath a motor driven cutting wheel which operates at high speed to mill a groove in the upper surface of the web to prepare it for the reception of the pull string. The side of the web in which the groove is milled is the side which is disposed inwardly when the web is subsequently wound into the endless tube.

As the web further advances through the machine, a string is deposited in its milled groove. As initially laid in the groove, this string is not cut into individual pull string lengths, but forms a part of a substantially endless supply string which is unwound from a supply spool mounted on the machine. As it comes off the spool, the string is threaded through a looper arm and a threader arm, both of which are mounted for transverse oscillation across the top of the web.

When the intermittent feeding cycle causes the web to pause in its advancement, the threader arm is moved laterally a slight distance across the web to move the string to one side of the groove, and the looper arm is also moved laterally in the same direction but through a much longer stroke to pull a length of string from the supply spool and form it into a controlled slack loop which is horizontally disposed across the top of the web. As soon as the threader arm has moved the string to one side of the groove, a reciprocable knife is moved downwardly through the web so that a short longitudinal slit extending completely through the web is formed in the groove on one side of the transposed string. The knife is then moved upwardly to remove it from the slit, and a hooked needle is simultaneously moved upwardly from the bottom of the web so that it follows the knife through the slit, thus bringing the needle hook above the upper surface of the web with its open side facing the laterally transposed string.

The threader arm is now moved backwardly across the groove to bring the string beneath the needle hook. The needle is then moved downwardly, thereby pulling the string through the slit and forming it into a loop which extends downwardly from the undersurface of the web. As this loop is pulled through the slit, its opposing legs move to the opposite ends of the slit, thus forming a V-shaped loop having its two legs separated an appreciable distance. At the completion of this V-shaped loop, its legs are wedged into the ends of the slit and are anchored there with reasonable firmness.

While the V-shaped loop is thus being created by the hooked needle, the looper arm is moved backwardly toward the groove to thus shorten the slack loop and permit the string which goes into the V-shaped loop to be pulled from the slack loop rather than from the spool itself. However, the looper arm does not at this time fully return to its initial position and so the slack loop is not completely dissipated by the formation of the stitch loop.

At the completion of the V-shaped stitch loop, its trailing leg is cut somewhat below the undersurface of the web by a transversely mounting knife, thus severing the stitch loop into a long and a short string segment, each of which is anchored in an opposite end of the slit. The cutting action results in the separation of an individual pull string from the spool, the long segment of the stitch loop forming the trailing end of the severed individual pull string and comprising a free end which projects from the undersurface of the web. It is this free end which later becomes the free end of the pull string which projects from the outer side of the container.

The short string segment forms the leading end of the supply string which remains attached to the supply spool. Thus, when the next feeding cycle advances the web, this short segment, which is wedged into and anchored in the slit, pulls the upper string forwardly with the web. During the initial portion of this feeding cycle, the resistance of the string to such forward movement is maintained at a minimum, in order to minimize the danger of pulling the short string segment from the slit, by a controlled collapse of the remaining portion of the slack loop which is effected by the completion of the return stroke of the looper arm. This collapse permits the supply string to move forwardly with the web without requiring that it be pulled from the supply spool. This is an important feature of the invention, for if it were necessary to pull the string from the spool during this portion of the cycle, the necessary pressure could, under some circumstances, pull the short supply string segment from the slit, with the result that control of the string would be lost.

The length of string made available by the collapse of the slack loop is sufficient to permit the anchored string portion to pass between a pair of feed rolls, one of which is provided with a bead which extends into the groove so that a pinching action on the string by the feed rolls is thereby effected. This pinching action becomes effective simultaneously with or immediately after the exhaustion of the slack loop string supply, so that thereafter the string is pulled directly from the supply spool, the pressure of the pinching action being sufficient to pull the string from the spool without slippage until the completion of the feed cycle, at which time the just described loop forming operations are repeated to again form an individual pull string. If desired, during this advancement the groove carrying the pull string may be passed beneath a nozzle for the application of a waxy adhesive to further secure the pull string in place.

As stated, each feeding cycle should result in the feeding of a length of web required to form a completed can body. Assuming that a specified length of web is normally required for a can body, the feeding devices are arranged to feed this length of body during each feed stroke. However, the spiral winding of fibre webs is an inexact art subject to uncontrollable variations due to normally encountered variations in web elasticity, factory temperatures and humidities, etc. so that frequently it is necessary to make minor adjustments in the web feed stroke to insure the production of can bodies wherein the pull strings are properly positioned with respect to the body labels. It will be realized that the errors resulting from these variations are usually minute in the case of individual body lengths, but that they are cumulative, and at commercial production speeds, the cumulative error can quickly have a disastrous effect unless corrected promptly.

To effect this correction, an index feature, which in the preferred form of the invention comprises a small hole punched through the web, is provided in the web simultaneously with each string severing operation. This hole is positioned in a fixed location in the web relative to the free end of the individual pull string which is created by such string severing operation.

As the web is advanced to the spiral winding machine these index features are scanned by an electronic detecting unit and their positions are compared to the positions of corresponding index marks printed on the preprinted label ply to determine whether the location of the pull strings in the web is such that they will be properly located relative to the labels in the wound tubes. If this comparison determines that the pull strings are creeping ahead of or falling behind their desired position in the web, selective impulses are sent to the feeding devices of the machine and utilized to either shorten or lengthen the arc of rotataion of the feed rolls, as required, to effect the necessary corrections in the length of the web fed in each feed cycle. Since this correction is made continuously, if required, the position of the individual pull strings in the web is constantly maintained within acceptable limits.

As a result of the various features just described, the present invention provides a practical and efficient means for performing a very difficult manufacturing operation.

An object of the invention, therefore is to provide a novel machine and method for providing individual pull strings in a continuous web of fibrous material which is thereafter spirally wound into a tube from which individual string open container bodies are subsequently cut.

Another object is the provision of a machine and method for forming the pull strings in the web in such manner that the major portion of each pull string lies against one side of the web while an end of each string extends through an opening in the web and dangles freely from the opposite side of the web and is thus adapted to provide the means to pull the string to tear open the body when the web is subsequently incorporated in a container body.

Still another object is the provision of such a machine and method wherein the individual pull strings are formed and severad from a continuous, substantially endless supply string.

Another object is the provision in such a machine of means to correlate the position of the pull strings in the web to their position in the ultimately cut bodies.

Another object is the provision of a machine and method of manufacturing fibrous, spirally wound, spirally labelled pull string bodies wherein the pull strings and the labels are properly positioned relative to each other.

Numerous other objects and advantages of the invention will be apparent as it is better understood from the following description, which, taken in connection with the accompanying drawings, discloses a preferred embodiment thereof.

Referring to the drawings:

FIG. 13 is a plan view of a small portion of the feed table showing the slot through which the stitch loop is pulled;

As a preferred and exemplary embodiment of the instant invention, the drawings illustrate a machine and method wherein a continuous succession of individual pull strings P, each of which is provided with a free end, are formed and secured in an endless web W of a suitable fibrous material which is subsequently spirally wound to form a ply in an endless tube which is thereafter cut into individual container bodies, each of which is provided with one of the pull strings properly located therein.

In the instant machine, the endless web W is fed intermittently along a feed table 50 as the various operations necessary to form the individual pull strings P are performed. The web W is obtained from any suitable source of supply (not shown). In entering the machine of the instant invention, it passes around a weighted roller 51 which is mounted for vertical movement on freely sliding bearings 52 in vertical slideways 53 formed in the machine frame 54, thus forming a slack loop 55 which is conventional in web feeding operation.

From the slack loop 55, the web W passes between the first set of feed rolls 56, 58 which, in conjunction with a second set of similar feeding rolls 60, 62 and a third set of feed rolls 64, 66, perform the web feeding operation.

The feed rolls 56, 58, 60, 62, 64, 66 are respectively mounted on short cross-shafts 57, 59, 61, 63, 65, 67 and are preferably all of equal diameter and are tied together so that they operate at the same speed and through the same carefully controlled arc of rotation during each feeding cycle of the machine. As the web W passes around the feed roll 58 is passes beneath a sawtooth cutter wheel 68 which is rotated at a very rapid speed by a suitable electric motor 70 (see FIGS. 1 and 2). The cutter wheel 68 is spaced above the feed roll 58 a distance which is somewhat less than the thickness of the web W, with the result that a continuous shallow groove G is milled into the upper surface of the web W.

After the groove G has thus been cut, the web W is advanced along the feed table 50 in a series of intermittent feeding operations, the length of web fed in each operation being determined by the arc of rotation through which the feed rolls rotate in each feeding circle. The rotation of the feed rolls 56, 58, 60, 62, 64, 66 is obtained from a drive shaft 72 which comprises the main drive shaft of the machine and is continuously rotated by a main drive motor 74 through a suitable gear box 76 (see FIG. 1). The main drive shaft 72 carries on it a small spur gear 78 which meshes with a large drive gear 80 mounted on a cross-shaft 82 suitably journalled in bearings secured to the frame 54.

Figure 2:
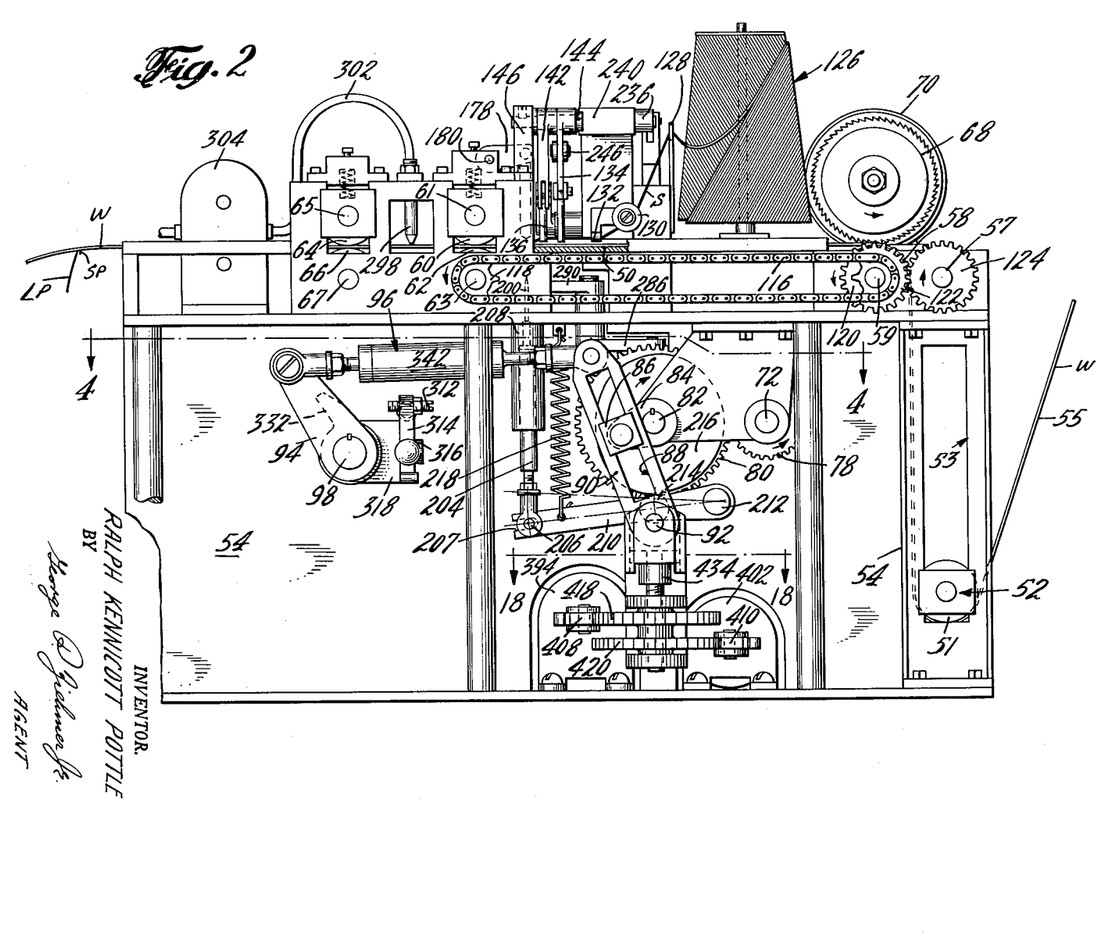
FIG. 2 is a side elevation of the machine taken substantially along the line 2—2 in FIG. 1.

On one of its ends, the shaft 82 carries a short arm 84 (see FIG. 2) having mounted thereon a slide block 86 which is slidably mounted in a slot 88 formed in a crank arm 90. The bottom end of the crank 90 is pivotally mounted on a pin 92, and as the continuous rotation of the gear 80 causes the arm 84 to continuously rotate in a clockwise direction (as seen in FIG. 2), the slide block 86 imparts an oscillating motion to the crank arm 90, which motion is transmitted to a second crank arm 94 through a connecting rod 96.

Figure 3:
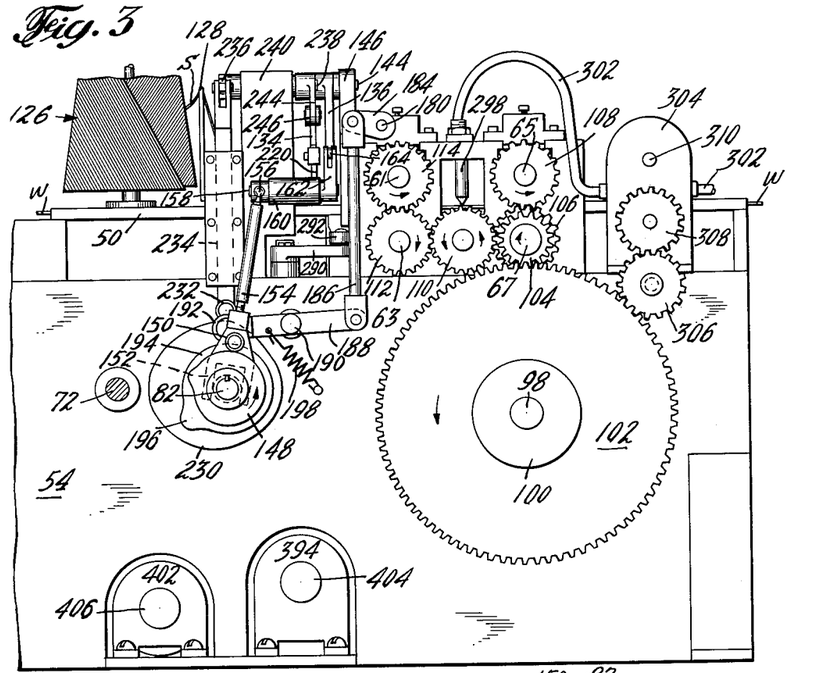
FIG. 3 is a partial side elevation of the opposite side of the machine, this view being taken substantially along the line 3—3 in FIG. 1.

The crank arm 94 is mounted at one end of a horizontal shaft 98 which at its opposite end carries a sprag type overrunning clutch 100 (see FIG. 3). The shaft 98 also carries on it, inwardly of the clutch 100, a large spur gear 102. The gear 102 is not keyed to the shaft 98, but is freely mounted on it and is connected to it, when the shaft 98 is rotating in one direction only, through the clutch 100 which functions to convert the oscillatory motion of the shaft 98 to an intermittent uni-directional motion of the large gear 102.

The intermittent motion of the gear 102 is imparted to a small spur gear 104 which is carried by the drive roll shaft 67, and the rotation of the shaft 67 is in turn transmitted to the shafts 61, 63, 65 by means of meshing spur gears 106, 108, 110, 112, 114. The rotation of the shaft 63 is transmitted to the feed rollers 56, 58 by a chain 116 (see FIG. 2) which operates around sprockets 118, 120 mounted respectively on the shafts 63, 59, and by spur gears 122, 124 mounted on the shafts 59, 57.

Thus, each time the gear 80 makes a complete revolution, the feed roll 56, 58, 60, 62, 64, 66 are actuated through a uniform predetermined arc of rotation to thereby advance the web W a predetermined distance along the feed table 50. The length of web W advanced during each such feeding cycle is equal to the developed length of the web which is necessary to produce a finished container body. Since the pivot pin 92 of the oscillating arm 90 is disposed in vertical alignment beneath the shaft 82, the web W is advanced during one-half of each feeding cycle and remains stationary during the other half of each feeding cycle.

As the web W is thus intermitently advanced along the feeding table 50, it advances past a spool 126 which contains a substantially endless supply of thin string S which is suitable for use as a pull string in a finished container body. As will be hereinafter explained, the string S is brought into closely spaced vertical alignment with the web groove G and is advanced through the machine with the web W and formed into individual pull strings P which are secured in place on the web W.

Figure 1:
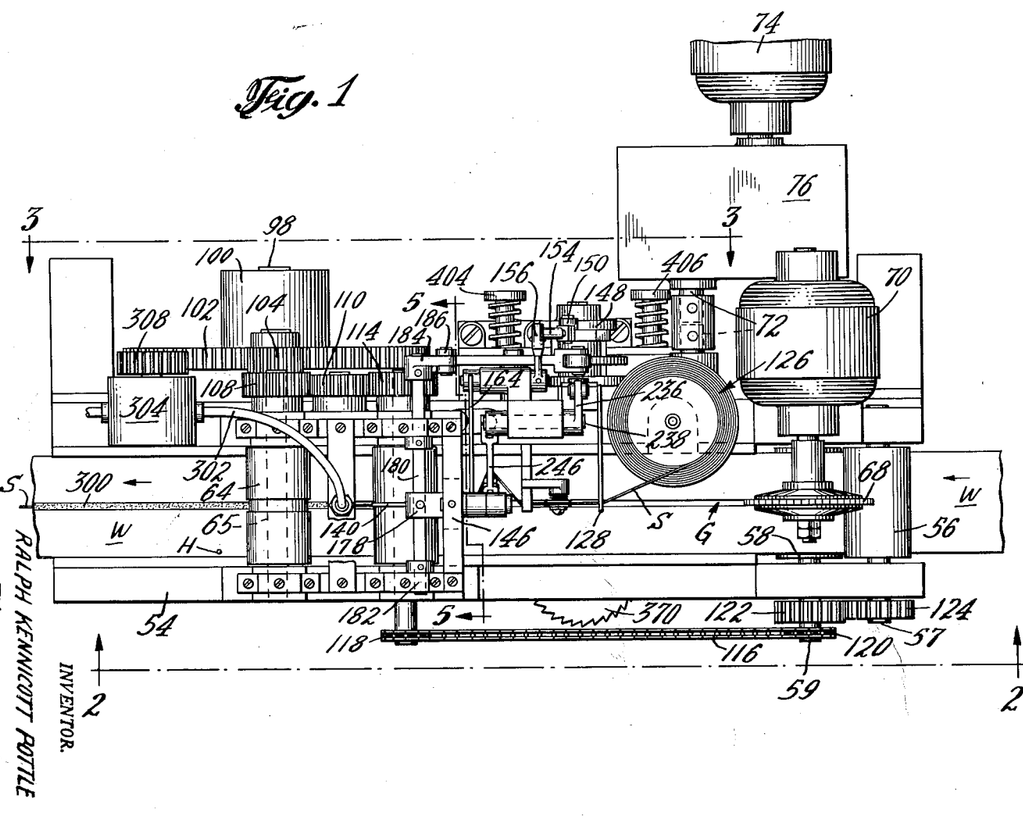
FIGURE 1 is a plan view of a machine embodying the principles of the instant invention.
Figure 6:
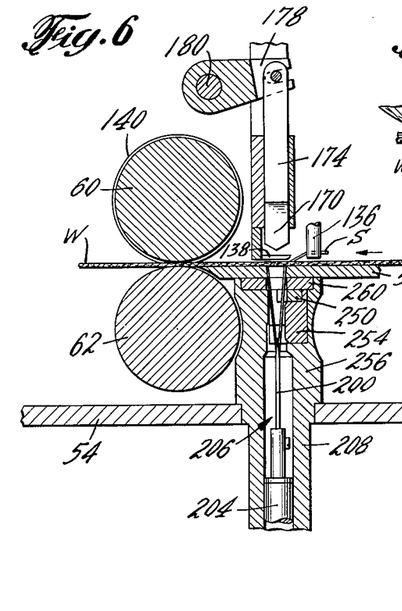
FIG. 6 is a sectional detail taken substantially along the line 6—6 in FIG. 5.
Figure 7:
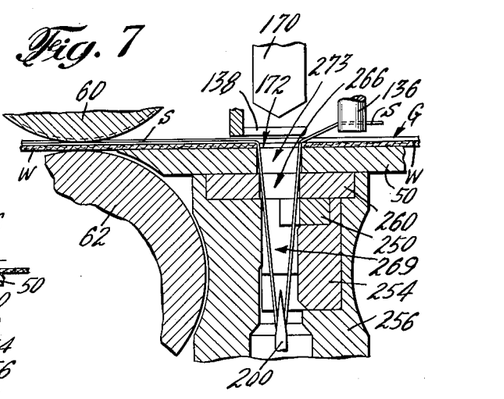
FIG. 7 is an enlarged view of a portion of the mechanism shown in FIG. 6.

As it comes off the spool 126, the string S passes through a high level fixed guide 128, through a conventional disc-type tension clamp 130 and then through a low level fixed guide 132. After passing through the fixed guide 132, the string S passes through narrow horizontal bores (not shown) formed in the botom ends of a looper arm 134 and a threader arm 136, and then passes beneath a split hold-down shoe 138 and into the bite of the feed rollers 60, 62. As seen in FIGS. 1 and 6, the upper feed roll 60 is formed with a bead 140 which extends into the web groove G and produces a pinching action against the string S which prevents it from slipping relative to the web W.

Figures 20, 21, 22, 23, 24, 25, 26, 27, 28, 29, 30:
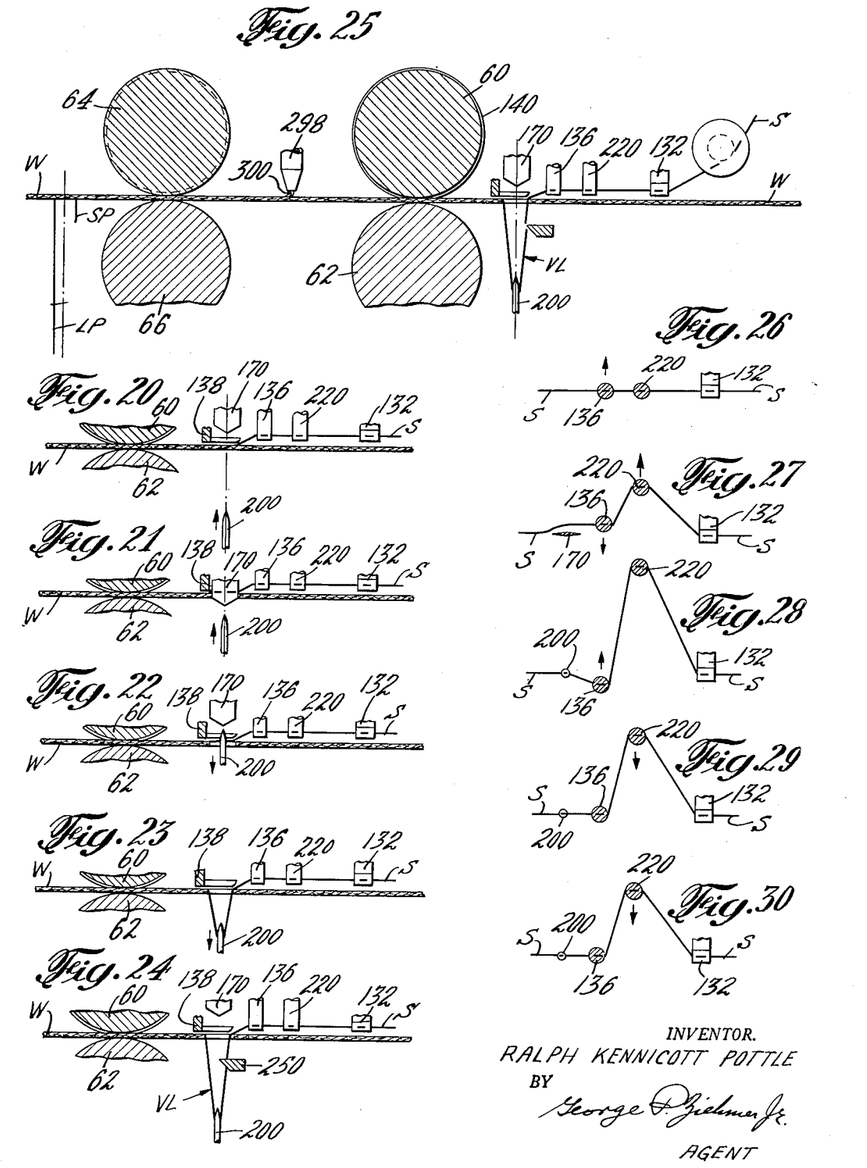
FIGS. 20–24 are schematic views illustrating in sequence the method steps employed in forming the vertical stitch loop in the pull string and then severing it to form the free end of the pull cord.
FIG. 25 is a schematic view showing an initial stage in advancement of the web immediately after the cutting of the stitch loop.
FIGS. 26–30 are schematic views, corresponding respectively to FIGS. 20–24, showing in sequence the method steps employed in the creation of the slack loop which is utilized to maintain control of the string during the creation of the stitch loop.

Each time the intermittent feeding action of the feed rolls bring the web W to a stop, the threader arm 136 is moved a short distance transversely across the web W to move the string S to one side of the groove, as best seen in FIG. 27.

The threader arm 136 comprises a lower replaceable portion 141 and an upper arm portion 142 which is freely mounted for lateral oscillation in a vertical plane on a stationary shaft 144 which is fixedly mounted in a cross-web 146 which forms a part of the machine frame 54.

The oscillatory movement of the threader arm 136 is effected by a small rotary edge cam 148 (see FIG. 3) which is keyed to the shaft 82. This motion is transmitted to the threader arm 136 via a cam roller 150 which is mounted on a yoke 152 adjustably mounted at the lower end of a connecting rod 154 which is secured to the outer end of a short horizontal rocker arm 156. The inner end of the rocker arm 156 is keyed to a short longitudinal rocker shaft 158 mounted in a fixed bearing 160. A second rocker arm 162 is secured to the other end of the rocker shaft 158 and is connected to the threader arm 136, intermediate its ends, by means of a connecting link 164. As a result, the vertical movement of the cam roller 150 which is imparted to it by the cam 148 is converted to an oscillatory movement of the threader arm 136, the roller 150 being maintained in contact with the cam 148 by the weight of the yoke 152 and rod 154.

As soon as the threader arm 136 moves the thread laterally in the web groove G, a thin knife blade 170 is moved downwardly through the groove G to puncture the web W and thereby form a short longitudinal slit 172 which is longitudinally disposed in the center of the groove G.

Figure 5:
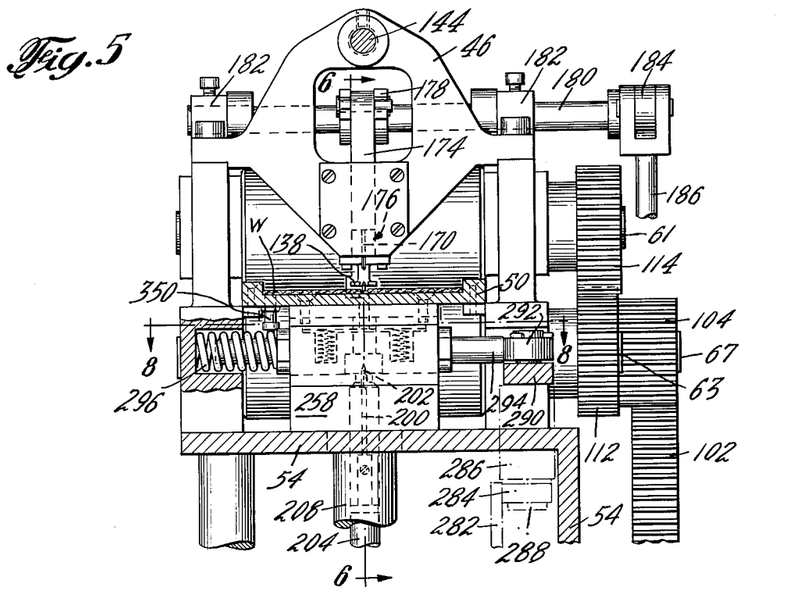
FIG. 5 is a sectional detail taken substantially along the line 5—5 in FIG. 1.

The knife blade 170 operates through a slot 173 formed in the feed table 50 and is mounted at the bottom of a slide 174 (see FIG. 5) which is mounted for vertical reciprocation in a slideway 176 formed in the cross-web 146. At its upper end the slide 174 is connected to one end of a short rocker arm 178 (see FIGS. 2 and 5), the other end of which is keyed to a cross-shaft 180 which is suitably mounted in bearings 182 formed in the machine frame 54. One end of the cross-shaft 180 has mounted on it a short rocker arm 184 (see FIG. 3). The arm 184 at its free end is pivotally secured to a vertical connecting rod 186, the lower end of which in turn is secured to a horizontal pivot arm 188. The pivot arm 188 is mounted on a fixed pivot 190 and carries at its other end a cam roller 192 which engages against the edge of a second edge cam 194 which is provided with a high spot 196 which actuates the knife 170. A spring 198 holds the cam roller 192 against the cam 194.

After the knife 170 has moved downwardly to form the slit 172 in the groove G, it is moved upwardly, as best seen in FIG. 22, to remove it from the slit 172. The split hold-down foot 138 strips the web W from the knife 170 during this upward stroke.

As the knife 170 is thus moved upwardly, a needle 200 having a transversely facing hook 202 (see FIG. 5) formed at its upper end is moved upwardly in closely following relationship to the knife 170. The hooked needle 200 is mounted in a needle holder 204 which is mounted for vertical reciprocation in a bore 206 formed in a bearing 208 mounted in the machine frame 54. The needle slide 204 at its bottom end is provided with a cross-pin 206 (see FIG. 2) which operates in a slot 207 formed at one end of a pivoted arm 210, the other end of which is mounted on a fixed pivot 212. Intermediate its ends, the pivot arm 210 carries a cam roller 214 which engages the edge of a third edge cam 216 carried on the continuously rotating shaft 82, the cam roller 214 being maintained in contact with the cam 216 by a spring 218.

The hooked needle 200 is mounted in vertical alignment with the knife blade 170 and thus passes through the slit 172 which has been cut by the knife blade 170 and at the top of its stroke comes to rest with its open hook 202 spaced above the upper surface of the web W and facing the string S which has previously been moved laterally in the groove by the threader arm 136. Because of its lateral transposition, there is no danger of the string S being cut by either the knife blade 170 or the needle 200.

As soon as the needle 200 comes to rest at the top of its stroke, the threader arm 136 moves backwardly across the groove G to the position shown in FIG. 28, thus bringing the string S beneath the needle hook 202 and in effect threading it into the needle 200. As soon as this threading operation takes place, the needle 200 moves downwardly (see FIG. 23), thus pulling the string S through the slit 172 and forming it into a vertical loop VL which projects at right angles from the undersurface of the web W. As seen in FIG. 23 the pulling action of the needle 200 causes the two legs of the loop VL to move to opposite ends of the slit 172 and thus the loop L assumes the shape of a V.

The portion of the string S which goes into the loop VL is not taken from the portion of the string S which is ahead of it in the web W (to the left in FIGS. 20–30) since this portion of the strings is secured against movement by the pinching action exerted by the bead 140 of the feed roll 60 and the feed roll 62 (see FIG. 25), nor is it pulled directly from the supply spool 126, since the rapid downward pull of the needle 200 would put the string S under a severe strain and might cause it to break.

To supply the string necessary for the loop VL, a horizontal slack loop SL is formed in the string S by a transverse movement of the looper arm 134 which gently pulls the necessary length of string S from the spool 126 just prior to the time the loop VL is formed. The movement of the looper arm 134 preferably starts at about the time the knife 170 begins its downward movement and is substantially completed by the time the needle 200 has risen to the top of its stroke.

The looper arm 134 is preferably provided at its lower end with a replaceable tip 220 and at its upper end is freely mounted on the shaft 144 which also carries the threader arm 136. The looper arm 134 is actuated by a fourth edge cam 230 (see FIG. 3) which is carried by the continuously rotating shaft 82 and operates against a cam roller 232 which is carried at the bottom of a vertical slide 234 and maintained against the edge cam 230 by the weight of the slide 234. The upper end of the slide 234 is secured to one end of a short horizontal rocker arm 236 (see FIG. 1), the other end of the rocker arm 236 being keyed to one end of a longitudinal rocker shaft 238 mounted in a bearing 240. The other end of the shaft 238 is keyed to a short vertical rocker arm 244 which at its bottom end carries a cross-link 246, the other end of the link 246 being secured to the looper arm 134 intermediate its ends to thus impart the necessary transverse motion to it.

The sequence of formation of the slack loop SL is disclosed in FIGS. 27 and 28, the latter figure showing the slack loop SL at its maximum size. As the needle 200 pulls the string S downwardly, thus creating the loop VL, the looper arm 134 begins its return stroke back towards the groove G, thus permitting the needle 200 to pull the string necessary for the formation of the loop VL from the slack loop SL and simultaneously causing the slack loop SL to collapse or decrease in size as shown in FIGS. 29–30. The movement of the needle 200 and the looper arm 134 are synchronized so that the rate of collapse of the slack loop SL corresponds exactly with the increase in size of the vertical loop VL to thereby keep the string S in both loops in a taut condition and thus insure that the string is at all times kept under complete control.

FIGURE 30 shows the position of the looper arm 134 at the completion of the formation of the loop VL. It will be seen that at this point in the operating cycle the slack loop SL, although reduced in size, has not been completely collapsed. The reason for this will be shortly explained.

As soon as the loop VL has been fully formed, its trailing leg (the one to the right as seen in FIGS. 6, 7, 23 and 24) is severed at a point spaced somewhat below the web W by a transversely slidable cutting blade 250 (see FIGS. 5–13) and the loop VL is thus divided into a long portion LP and a short portion SP (see FIG. 25), both of which are anchored in the slit 172. The cutting blade 250 fits snugly into a recessed seat 252 formed in the top of a cross-slide 254 which is mounted for horizontal reciprocation in a groove 256 which is formed in an enlarged head 258 which is formed integral with and at the upper end of the needle slide bearing 208.

The movable cutting blade 250 is forced upwardly against the upper surface of a stationary cutting blade 260 by a pair of springs 262 carried in the slide 254, the stationary blade 260 being secured to the head 258 by a pair of screws 264 which also secure the head 258 to the feed table 50. The stationary cutting blade 260 is formed with a roughly triangular slot 266 which is disposed in substantially vertical alignment with the feed table slot 173, while the sliding cutting blade 250 is formed with a dovetail cutout 268 which is vertically aligned beneath the slot 266 when the cross slide 254 is in its non-cutting position. The slide 254 is also cut away at 269 to receive the loop VL.

Figure 8:
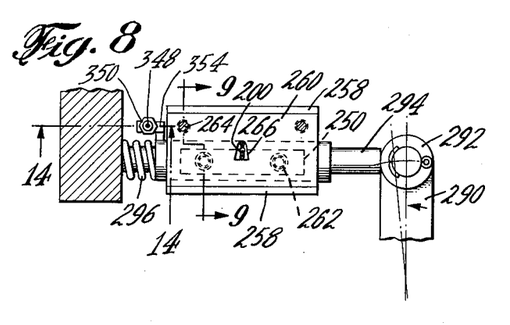
FIG. 8 is a sectional detail taken substantially along the line 8—8 in FIG. 5.
Figure 9:
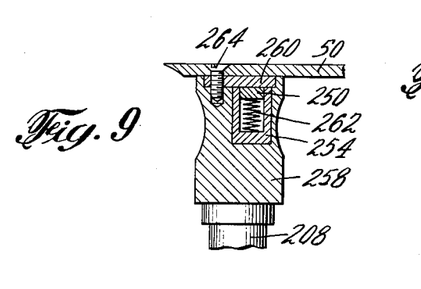
FIG. 9 is a vertical section taken substantially along the line 9—9 in FIG. 8.
Figures 10, 14:
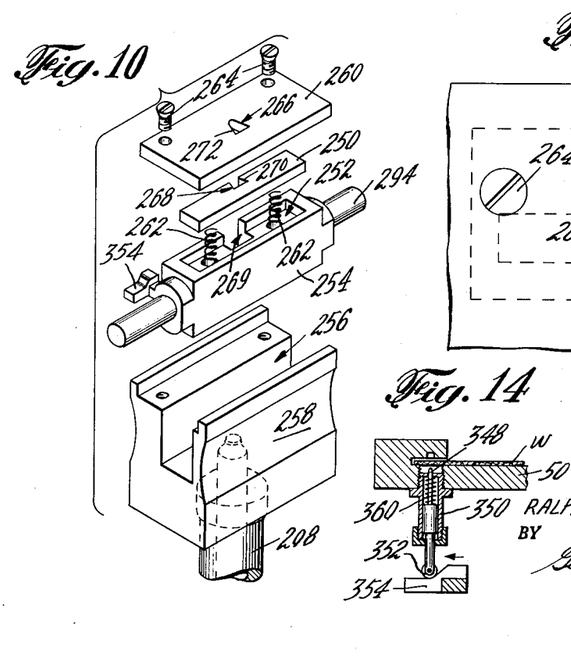
FIG. 10 is an exploded view of the mechanism shown in FIGS. 8 and 9.
FIG. 14 is a sectional detail of the hole punching mechanism of the machine, taken substantially along the line 14—14 in FIG. 8.
Figure 11:
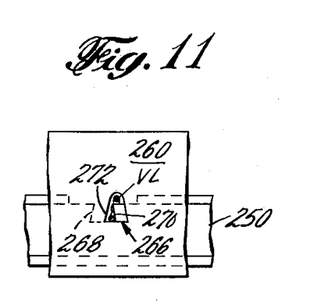
FIGS. 11 and 12 are enlarged views of a portion of the thread cutting mechanism shown in FIG. 8, showing successive stages in the thread cutting operation.
Figure 12:
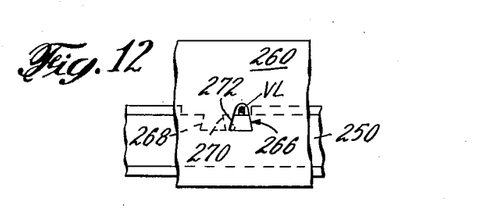

As seen in FIGS. 8 and 13, the movable cutting blade 250 is so positioned that its transverse edge in which the dovetail cutout 268 is formed is in substantial transverse alignment with the needle 200. Thus, when the loop VL is formed, its trailing leg is positioned within the dovetail cutout 268 of the cutting blade and is severed when the cutting blade 250 is moved transversely with the cross slide 254, the cutting action being effected between the upper edge 270 of one of the inclined walls of the dovetail cutout 268 and the lower edge 272 of one of the inclined walls of the triangular slot 266.

Figure 4:
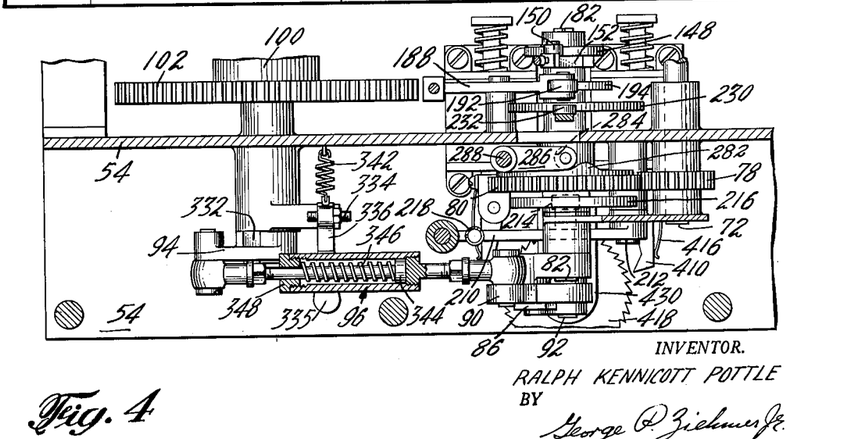
FIG. 4 is a sectional view taken substantially along the line 4—4 in FIG. 2.

The transverse movement of the cross slide 254 necessary to effect this cutting action is produced by a face cam 282 (see FIG. 4) which is carried by the shaft 82 and engages against a cam roller 284 carried at one end of a rocker arm 286, the other end of the arm 286 being secured to a vertical rocker shaft 288. The rocker shaft 288 carries at its upper end a second rocker arm 290. At its opposite, free end, the arm 290 carries a roller 292 which engages against a cylindrical extension 294 formed at one end of the cross slide 254 (see FIGS. 8, 10), and forces the slide 254 through its cutting stroke at the proper time. After the cutting action is effected, the blade 250 is moved back to its inoperative position by a suitable expansion spring 296 (see FIGS. 5, 8).

As a result of this cutting action an individual pull string P, which includes the string portion LP as its trailing end, is cut from the main string S. At its front end, this individual pull string P terminates in the portion SP which was formed in the immediately preceding cutting operation. The short portion SP which is formed by the current cutting operation remains attached to the main string S, and becomes the leading end of the immediately succeeding pull string P which is formed by a repetition of the just described looping and cutting operation in the succeeding operating cycle of the machine.

Before this next operating cycle can take place, however, the web W and the string S must be advanced one body blank length. This is effected by the rotation of the feeding rollers 56, 58, 60, 62, 64, 66 through their predetermined arc of rotation in the manner heretofore described. During this advancement, the string portion LP pulls smoothly out of the needle hook 202 and moves with the web W without difficulty. At the beginning of this next feeding cycle, however, the only means for advancing the supply string S with the web W is the anchoring of the string portion SP in the trailing end of the slit 172. It is obvious that this anchoring could not be relied upon to pull the string from the supply spool 126, since the inertia of the spool 126, would tend to pull portion SP out of the slit 172.

This danger, however is obviated by the fact that the slack loop SL at this point in the cycle is only partially collapsed and that there remains in it a length of string in excess over that which was required to form the loop VL, and of sufficient length, upon the full collapse of the slack loop SL, to enable its leading end portion SP to reach or pass between the feed rollers 60, 62 before it becomes necessary to pull additional string from the supply spool 126. To make this excess length of string available for this purpose, the edge cam 148 is contoured so that at the beginning of the web feeding operation, the looper arm 134 is moved from its partially returned position of FIG. 30 to its starting position of FIG. 26, thus permitting complete dissipation of the slack loop SL and allowing the string S to be pulled forward by the web W without exerting pressures which would pull the string portion SP out of the slit 172. Once the thus advanced string S passes between the feed rollers 60, 62, the pinching action which is produced by the bead 140 exerts a sufficient holding pressure against the string S to enable the length of string necessary for the completion of this feeding stroke to be pulled directly from the supply spool 126. At the completion of this feeding stroke the web W again halts and the just described looping and cutting operations are repeated to form another individual pull string P having a free trailing end LP.

The advancement of the web W in each feeding cycle causes the groove G to pass beneath a fixedly mounted nozzle 298 which deposits a waxy adhesive 300 in the groove G to thus secure the pull strings P in place therein. The adhesive 300, which may comprise a mixture of paraffin and microcrystalline waxes, is obtained from any source of supply such as a reservoir (not shown) and flows to the nozzle 298 through a supply pipe 302. A gear type pump 304 (see FIGS. 1 and 3) is interposed in the pipe 302 in order to maintain the desired feeding pressure. The pump 304 is preferably mounted on the frame 54 and is driven from the gear 102 through a small spur gear 306 which meshes with a spur gear 308 secured to one of the pump shafts 310. Since the drive gear 102 rotates only when the web G is being advanced, the flow of waxy adhesive 300 ceases each time the web W stops, and consequently the deposit of an excess of adhesive 300 on the web W during the time it is stopped beneath the nozzle 298 is prevented.

After the web W has had the pull strings S thus secured in place, it passes from the string applying machine and is fed onto a stationary winding mandrel 312 (see FIG. 31) of a spiral winding machine 314 which forms it into one of the layers of an endless spirally wound tube 316 which is subsequently cut into individual can bodies 318. The winding machine 314 utilizes a conventional winding belt 319. Since the spiral winding machine 314 operates continuously, the web W is passed through a festooning mechanism (not shown) which is interposed between the string applying machine and the spiral winder 314 in order to obtain smooth transition from the intermittent web feed of the string applying machine.

Figures 31, 32:
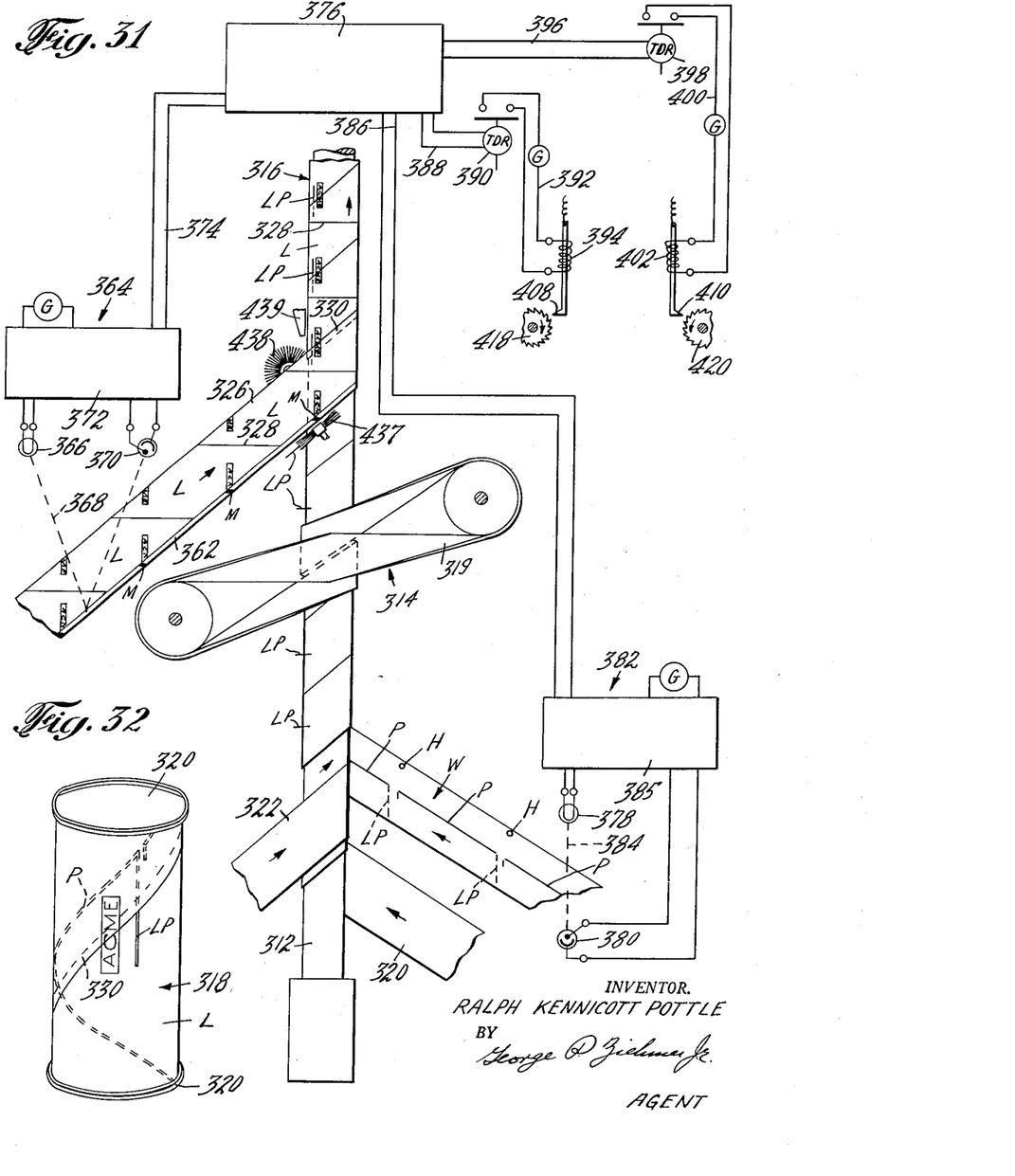
FIG. 31 is a schematic plan view illustrating the spiral winding machine and operation, and showing the electrical and electronic controls for registering the pull strings with the preprinted body labels.
FIG. 32 is a perspective view of a finished can body provided with a registered preprinted label and a pull string according to the principles of the instant invention.

In the disclosure of FIG. 31, the tube 316 is formed of four plies, the first (inner) ply 320 comprising a suitable thin liner having its spiral edges overlapped in the tube 316, the second ply 322 comprising heavy body stock having its edges butted, the string carrying web W comprising the third ply which also has its edges butted, and fourth ply 326 comprising a thin label ply having preprinted thereon a succession of uniform unitary label patterns L which are so designed and dimensioned that when the label ply 326 is wrapped into tubular form, the patterns L are disposed circumferentially around the tube in such manner that when the tube 316 is later cut circumferentially into individual bodies 318 a complete label pattern L appears on each body. To accomplish this, each unitary pattern L is printed on the label ply on the diagonal and the patterns L are separated from each other along diagonal lines 328, which may be real or imaginary, and along which, or in substantial proximity thereto, the severing cuts which divide the tube 316 into individual can bodies 318 are made. As will readily be seen, these diagonal lines 328 are positioned along the tube at regularly spaced intervals, the distance between such lines 328 being carefully calculated to produce, in the wound tube, individual can bodies 318 of the desired length.

However, as is well known, the art of spirally winding webs into tubes to form tubular can bodies is a somewhat inexact procedure wherein the length of the tube formed from a given length of web has a tendency to vary due to variations in winding pressures, winding angles, etc. It is also well known that the normally encountered factory variations in temperature, humidity, glue absorption, etc. are sufficient to cause shrinkage or expansion of the plies. As a result, serious problems are encountered when it is desired to wind a web containing uniformly spaced elements, such as the printed label patterns L into a tube which is afterwards cut into can bodies of predetermined lengths, since the above mentioned variations frequently result in non-uniform spacings of these elements in the wound tube. These spacing errors, while small, are cumulative and quite rapidly reach such proportions that if they are not corrected, they can result in complete spoilage of the cut bodies. One solution to this problem, as it applies to the formation of spirally wound containers bearing preprinted unitary label patterns, is disclosed in United States Patent 2,737,091 issued on March 6, 1956 to E.B. Robinson. However, in providing such containers with pull strings P, an additional complication is introduced by reason of the fact that the individual pull strings P must be disposed in the body web W in such manner that they will be in registry with the preprinted label patterns L in the wound tube so that when the tube is cut into individual can bodies 318, each body 318 will contain a pull string P which is properly located so that the string portion LP is disposed adjacent an end of the body (see FIG. 32) so that the major portion of the body length will be torn when the string is pulled. Such a container construction is disclosed in the previously mentioned Pottle et al. application Serial No. 729,366.

For the purposes of this disclosure, it is sufficient to state that such container comprises a body 318 which is closed at its ends by clinched on metal closures 320 (see FIG. 32). The outermost ply of the body 318 comprises the label ply 326 which has its spiral edges lapped as at 330. Beneath the label ply 326 is positioned the web W, which is so wound on the mandrel 312 that the groove G and major portion of the pull string S are disposed on the inside of the web W 326, the pull string end portion LP being disposed on the outside of the web W and extending between the web W and the label ply 326 to the label lap 330, and then projecting freely on the outside of the container so that it can be easily grasped by the ultimate consumer and pulled upwardly to first tear through the label ply 326 to the point where it passes through the web W, and then pulled downwardly to tear through both the web W and the label ply 326. The pull string P is disposed over the butt joint of the second ply 322 so that when the tearing operation has been completed, only the thin liner ply 320 holds the body together, and this ply 320 is easily ruptured by a twisting action applied to the ends of the container.

To effect the necessary registration of individual pull strings P with the unitary label patterns L in order to produce container bodies 318, provision is made in the instant machine and method for adjusting the feed stroke of the feed rollers 56, 58, 60, 62, 64 and 66 so that variations in the spacing between the string portions LP can be obtained. If it is determined that the individual pull strings P are badly out of registration with the label pattern L, provision is made to effect a gross adjustment of the feeding stroke so that the individual pull strings P can be quickly moved into substantial registration with the label patterns L. Provision is also made to effect a vernier adjustment of the feed stroke which is effective to thereafter maintain the pull strings P and the label patterns L in registration, regardless of whether minute variations in the length of the label patterns do exist.

Figures 15, 16, 17, 18, 19:
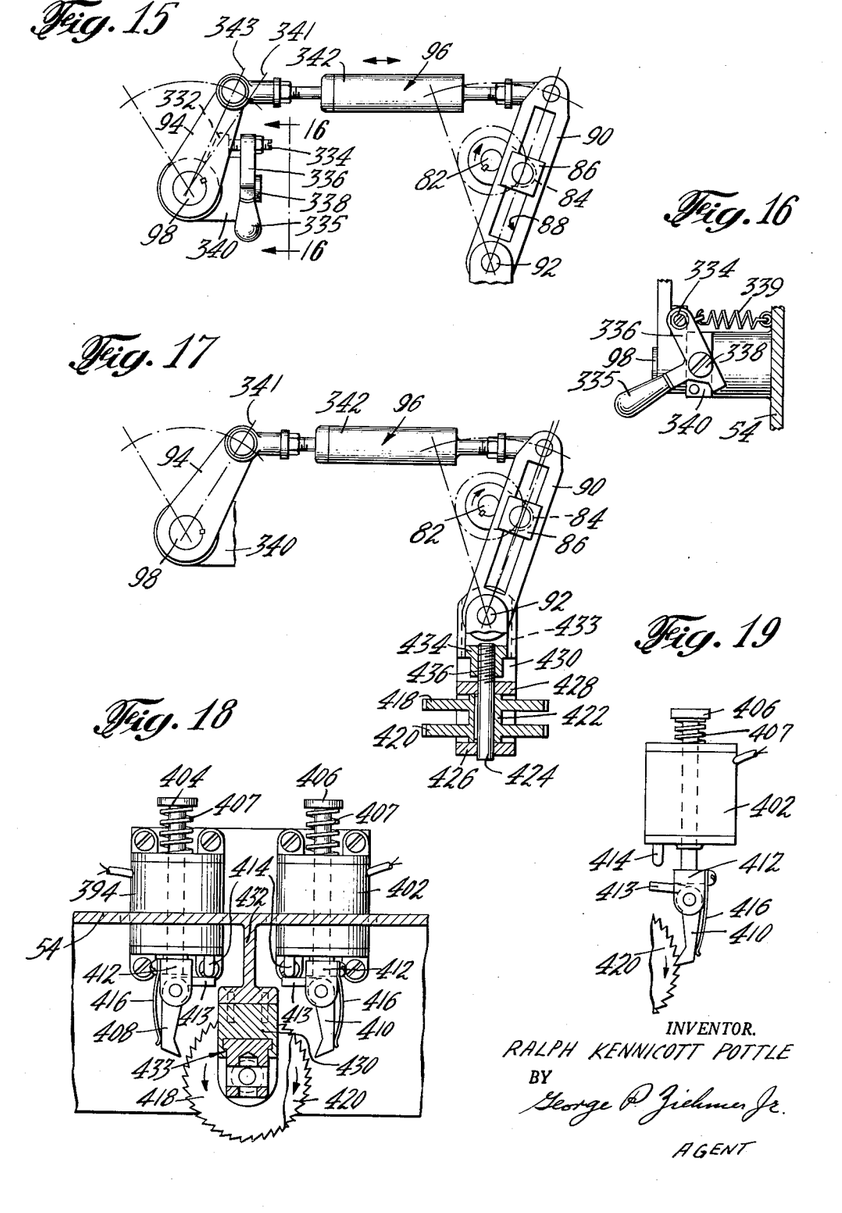
FIG. 15 is a side elevation of a portion of the mechanism for driving the feed rolls intermittently, showing the manually operated latching mechanism for effecting a gross shortening of the feed stroke in order to effect rapid adjustment of the position of the stitch loops in the web, parts being broken away.
FIG. 16 is a sectional detail of the manually operated latching mechanism taken substantially along the line 16—16 in FIG. 15.
FIG. 17 is a view similar to FIG. 15 but showing how a vernier adjustment of the feed stroke is effected by a change in the center of oscillation of the oscillating crank arm.
FIG. 18 is a sectional detail of the vernier adjustment mechanism taken substantially along the line 18—18 in FIG. 2.
FIG. 19 is a sectional detail showing one of the solenoid operated latches of the vernier adjustment mechanism during an operating stroke, parts being broken away.

To effect the gross adjustment of the feed stroke, a short arm 332 (see FIG. 15) is secured to the crossshaft 98 in alignment with the crank arm 94, and an adjustable stop pin 334 is mounted on one arm of a bell crank 336 which is mounted on a pivot pin 338 which is secured to a bracket 340 formed in one of the bearings in which the shaft 98 is journalled. A spring 339 normally maintains the bell crank in retracted, inoperative position wherein the stop pin 334 does not interfere with the arm 332. When it is desired to effect the gross adjustment, the machine operator presses the handle arm 335 of the bell crank 336 downwardly to bring the stop pin 334 into alignment with the arm 332 so that it engages the arm 332 and shortens the arc of oscillation of the shaft 98. In FIG. 15, the dot and dash line 341 indicates normal extent of the arc of oscillation of the shaft 98, while the dot and dash line 343 indicates the shortened stroke of the shaft 98 during the time the gross adjustment is being made.

In order to permit this shortened stroke of the shaft 98, the connecting rod 96 which connects the crank arm 94 to the crank arm 90 is split, one end having secured to it a hollow cylinder 342 and the other end being formed with an expanded head 344 which is disposed within the cylinder 342. A spring 346 is interposed between the expanded head 344 and the end plug 348 of the cylinder 342. As a result of this construction, the shortening of the stroke of the shaft 98 is taken up by a compression of the spring 346.

As a result of this gross adjustment, the feed stroke of the feed rollers 56, 58, 60, 62, 64, 66 is shortened an appreciable distance and the individual pull strings P, if found to be greatly out of registration with the label patterns L in the tube 316 when the machine is first started up, can be quickly brought into registration therewith with a minimum of spoilage merely by holding the handle 334 in its down position until the adjustment is made. When the individual pull strings P have thus been brought into registry with the label patterns L, the handle 335 is released and the spring 342 is permitted to pull the stop screw 334 away from contact with the arm 332, thus permitting the shaft 98 to resume its normal stroke.

To provide the means for automatically maintaining the individual pull strings P in registry with the label patterns L, a string end index feature or mark is incorporated in the web B in uniformly spaced relationship to the portion LP of each pull string P. This index feature or mark could be of any desired type, such as a printed spot or the like. In the present invention, however, the index feature or mark preferably comprises a small hole or puncture H which is formed in the web by a pointed punch 348 (see FIG. 14) which is mounted in a cylindrical holder 350 secured to the underside of the feed table 50 closely adjacent the slide 254. The punch 348 is provided at its lower end with a cam roller 352 and is moved upwardly through its punching stroke by a small cam 354 which is carried by the slide 254. To prevent upward movement of the web W during the punching operation, the feed table 50 is provided with a small overhanging portion 356 (see FIG. 14) provided with a recess 358 into which the punch 348 moves on its up stroke. A spring 360 returns the punch 348 to its down position after each transverse stroke of the operating cam 354.

As a result of the position of the punch 348, a hole H is punched in the web W in substantial lateral alignment with each string portion LP. Since they are formed by a pointed punch, no material is removed from the web W during the formation of the holes H. These holes H are automatically compared with a label indexing mark M which is provided in a predetermined location in each preprinted unitary label pattern P (see FIG. 31) as the web W and the label ply 326 are fed toward the winding mandrel 312. The label indexing mark M may be the same mark which is used to control the position of the cut-off knives which sever the tubes along the diagonal lines 328, as disclosed in the aforementioned Robinson Patent 2,737,091, and is preferably formed in a marginal portion 362 of the label ply 326 which portion becomes the underlap of the label lap portion 330 in the wound bodies 318 and thus is concealed from view.

As the label ply 326 approaches the winding mandrel 312, it is passed beneath an electronic scanning unit 364 which includes a source of light 366 which is focused on the marginal label portion 362 in such manner that a light beam 368 is reflected from the label ply into a photoelectric cell 370. As a result, each time the beam 368 is intercepted by an index mark M, the output of the cell 370 is varied. This variation is utilized by a conventional electronic unit 372 to produce a momentary pulse in an electrical circuit 374 which feeds the pulse to an electronic pulse timing comparator 376.

Simultaneously with the scanning of the label ply 326, the web W is passed between a light source 378 and a photoelectric cell 380 of a second scanning unit 382. The web W normally intercepts the light beam 384, but each time a hole H passes between the light source 378 and the cell 380, the cell 380 is momentarily energized, and the pulse emitted by it is amplified by an amplifier unit 385 and is fed through a second circuit 386 into the electronic pulse timing comparator 376. The details of construction of the comparator 376 form no part of the instant invention and are thus not shown. However, in operation, the comparator 376 functions to compare the timing of the pulses in the circuits 374, 386. If the pulses are substantially simultaneous, the comparator performs no corrective function. However, if the pulse in the circuit 386 is found to be earlier than that in the circuit 374, it indicates that the pull strings P are moving ahead of the label patterns L, and the comparator 376 becomes effective to produce an impulse in a control circuit 388 to thus energize a time delay relay 390, which in turn produces a current of predetermined duration in a circuit 392 and energizes a solenoid 394 (see FIGS. 18, 31).

Conversely, if the pulse in circuit 374 precedes the pulse in circuit 386, an indication is given that the label patterns L are creeping ahead of the pull strings P, and the comparator 376 functions to produce a pulse in a second control circuit 396, thus energizing a second time delay relay 398, which in turn closes a circuit 400 and energizes a second solenoid 402.

The solenoids 394, 402 are mounted on the machine frame 54 and are provided with armatures 404, 406 respectively, which are normally held in retracted position by springs 407 which operate against the outer ends of the armatures. At their inner ends, the armatures 404, 406 are provided respectively with pawls 408, 410 which are pivotally mounted on bearings 412 secured to the armatures. The pawls 408, 410 are formed with integral lugs 413 which, when the armatures 404, 406 are in their normal retracted position, as shown in FIG. 18, engage against stop pins 414 carried by the solenoids 394, 402 to force the pawls 408, 410 outwardly against the pressure of leaf springs 416 carried by the bearings 412.

The solenoids 394, 402 are vertically offset with respect to each other so that pawl 408 of the upper solenoid 394 is disposed in horizontal alignment with an upper ratchet wheel 418, while the pawl 410 of the lower solenoid 402 is disposed in horizontal alignment with a lower ratchet wheel 420.

The ratchet wheels 418, 420 are formed with their ratchet teeth extending in the opposite directions, and are preferably formed integral with a single hub 422 which is keyed to an adjustment screw 424 (see FIGS. 2 and 17) and mounted between a pair of horizontal lugs 426, 428 which hold it against vertical movement. The lugs 426, 428 are formed integral with a vertical block 430 which is secured to a web 432 which forms a part of the machine frame 54. At its upper end, the block 430 is formed with a slideway 433 in which is mounted a slide 434 which carries the pivot pin 92 on which the crank arm 90 is mounted. The bottom of the slide 434 is provided with an internally threaded bore 436 into which the threaded upper portion of the adjustment screw 424 threadedly engages, so that rotation of the adjustment screw results in a raising or lowering of the pivot pin 92, depending on the direction of such rotation, and a consequent lengthening or shortening of the stroke of the crank arm 90 which, in turn, results in a corresponding lengthening or shortening of the feed stroke of the feed rollers 56, 58, 60, 62, 64, 66. By this means, a vernier adjustment of the feed stroke of the machine is made possible.

Each time it is determined that the pull strings P are falling behind of the label marks M, the solenoid 402 is energized and its armature 406 is moved forwardly against the pressure of the spring 407 thus moving the pawl 410 towards the lower ratchet wheel 420. This forward movement disengages the pawl lug 412 from the stop pin 414 and permits the spring 416 to pivot the pawl 410 so that it is moved into contact with one of the teeth of the lower ratchet wheel 420 to thereby rotate the ratchet wheel in a clockwise direction a predetermined distance (see FIG. 19). This moves the pivot 92 upwardly and lengthens the stroke of the crank arm 90, which in turn results in a lengthening of the feed stroke of a machine and an increase in the length of web W which is fed during each cycle of the machine so that the length of each individual pull string P is thereby increased.

In a similar manner, should it be determined in the scanning operation that the pull strings P are falling behind the label marks M, the upper solenoid 394 is energized, to bring the pawl 408 into engagement with the upper ratchet wheel 418 to rotate the ratchet assembly in a counterclockwise direction, thereby lowering the pivot 92 to decrease the length of the stroke of the crank arm 90, and consequently decreasing the length of the individual pull strings P in the web W.

It will be understood that this vernier adjustment is automatically made whenever necessary. Under normal manufacturing conditions, certain tolerances are allowable for the position of the pull string P relative to a given area in a label pattern L. Thus, variations of 1/4" from the normal position may be tolerated without requiring adjustment of the feed stroke. It will thus be seen that the frequency at which the vernier adjustment need be made depends upon both the winding comditions encountered and the permissible tolerances, and that under some conditions, the vernier adjustment will be made almost continuously, while under others it will be required only at considerable intervals.

As the label ply 326 is fed onto the tube 316 beyond the winding belt 319, the long string portions LP are successively engaged by a pair of rotary brushes 437, 438 which controls their position so that they project from the label overlap 330 and are not completely covered and thus concealed by the label ply 326.

The brush 437 is disposed adjacent the trailing edge of the label ply 326 and functions to lay the string portions LP parallel to that edge and thus keeps them from being caught beneath the label ply 326 as that ply initially is fed onto the wound tube. The brush 438 is disposed beneath the label ply 326 adjacent its leading edge and is rotated in a forward direction (counterclockwise as seen in FIG. 31) thus throwing the string portions LP forwardly so that the free ends thereof will project from between the label overlap 330. If desired, a vacuum nozzle 439 may be provided to assist in holding the string portions LP in forwardly projecting position. The construction and operation of the brushes and vacuum nozzle are separately covered by United States application Serial No. 21,262, filed April 11, 1960 in the name of William B. Elam, now Patent No. 2,997,931, dated Aug. 29, 1961.

After the winding operation has been completed, the tube 316 is severed substantially along the lines 328 by an appropriate cutting device in the manner disclosed in the previously mentioned Robinson Patent 2,737,091 to thereby form the individual can bodies 318, each of which bears a complete unitary label pattern L and a properly positioned pull string P. This cutting operation preferably is spaced somewhat away from the string end LP, and on the other side of the slit 172, and thus severs the preceding pull string P in the tube 316 with the result that each body 318 contains a long string end portion LP which becomes the end which is grasped and pulled by the ultimate consumer to open the container, and a short string end portion SP which is covered by the label ply 326, as best seen in FIG. 32, and serves no function in the finished container.

It is thought that the invention and many of its attendant advantages will be understood from the foregoing description, and it will be apparent that various changes may be made in the form, construction, and arrangement of parts of the apparatus mentioned herein and in the steps and their order of accomplishment of the method described herein, without departing from the spirit and scope of the invention or sacrificing all of its material advantages, the apparatus and method hereinbefore described being merely a preferred embodiment thereof.

I claim:

1. A method of producing a spirally wound tube preparatory to cutting therefrom individual container bodies of predetermined length each having a spirally wound unitary label pattern and each being provided with a pull string disposed in a predetermined relationship to said label pattern, comprising the steps of providing a label web having said label patterns successively disposed thereon and having index features therein located in predetermined relationship to said label patterns, providing a body ply web, bringing an endless string into position adjacent one side of said body ply web and in longitudinal alignment therewith, pulling said endless string through said body ply web at predetermined intervals equal to the length of the subsequently formed individual container bodies from loops projecting from the opposite side of said body ply web, cutting said loops to create free ends in said pull strings, providing index features in said body ply web in predetermined relationship to said free ends, feeding said webs toward a winding mandrel preparatory to winding them into a tube, comparing the positions of said label web index features with the positions of said body ply web index features while said webs are thus being fed to ascertain the relative positions of said label patterns and said pull strings, correcting the position of subsequently formed loops in said body ply web when said comparison indicates a variation from registered position, and spirally winding said webs around said winding mandrel to form them into a tube.

2. A machine for forming individual pull strings in a web of material, including an operating station, feeding means operable through a feed stroke for advancing said web through said operating station, means for actuating said feed means intermittently with a dwell after each feed stroke, means for guiding a supply string into proximity to a first side of said web at said operating station, a hook needle disposed at said operating station on the opposite side of said web, means for projecting said needle through said web adjacent but not touching said supply string during each dwell of said feed members, means operable during each of said dwells for moving said supply string toward said projecting needle to thread said supply string into the hook of said needle, means operable during each of said dwells for withdrawing said needle backwardly through said web to pull a portion of said supply string through said web and form it into a loop extending from said opposite side of said web and means operable during each of said dwells for severing the string in said loop at a point spaced from said web to thereby separate from said supply string an individual pull string comprising as a tearing portion a length of string advanced during the preceding feed stroke and disposed on said first side of said web and as a grasping portion a portion of said cut loop which is disposed on the opposite side of said web.

3. The machine of claim 2 wherein means are provided to form a slack loop in said supply string at said operating station prior to the time said first named loop is pulled through said web by said needle, and wherein said means are operable to collapse said slack loop in time with said needle withdrawing means to permit the string in said slack loop to be pulled into said first named loop.

4. The machine of claim 2 wherein there are additionally provided means for forming an indexing feature in said web in predetermined spaced relationship to each of said loops, means for producing signals from said indexing features as the web advances, means responsive to said signals and including vernier means for adjusting said feed stroke of the feeding means thereby to adjust closely the intervals between said loops and thus maintain said individual pull strings in registration in said wound tube.

5. The method of claim 4 wherein there are provided stop means operable on said feeding means to effect a gross adjustment of said feed stroke independently of said means responsive to said signals whereby rapid gross adjustment of said registration of strings in the wound tube are effected when desired.

6. A machine for forming individual pull strings in a web of material, including an operating station, feed rolls operable against said web for advancing said web through said operating station, means for actuating said feed rolls intermittently with a dwell between each feed stroke, means for cutting a groove in a first side of said web as said web approaches said operating station, means for guiding a supply string into proximity to said groove on said first side of said web, a looper member disposed adjacent said operating station and movable transversely of said web to form a slack loop in said supply string, slitting means disposed at said station and operable during each of said dwells for forming a slit through said web in said groove, a needle having an open hook at its end disposed at said operating station on the opposite side of said web, means for projecting said needle through said slit to move said needle hook into position facing said supply string on said first side of said web during each of said dwells, a threader member disposed at said operating station and operable during each of said dwells to move said supply string into said needle hook to thread said supply string into said needle, means operable during each of said dwells to withdraw said needle backwardly through said slit and to a position spaced from said web to thereby pull said supply string from said slack loop and form it into a substantially V-shaped loop extending from said opposite side of said web with the opposing legs of said V-shaped loop anchored in the web material at the ends of said slit, means operable in time with said needle withdrawing means to move said looper member backwardly toward its original position to collapse said slack loop as said V-shaped loop is being formed, cutting means disposed at said operating station for cutting the string in the trailing leg of said V-shaped loop to separate from said supply string an individual pull string comprising as a tearing portion a length of string advanced during the preceding feed stroke and disposed on said first side of said web and as a grasping portion the portion of said loop which has been separated from said supply string by said cutting means.

7. The machine of claim 6 wherein means are provided to deposit an adhesive material in said groove as the web is being advanced from said operating station to adhere said tear string in said groove.

8. The machine of claim 6 wherein string feeding means are provided beyond said operating station to pinch said string against the bottom of said groove to advance it with said web, wherein said looper member is only partially returned to its initial position during the formation of said V-shaped loop so that said slack loop is only partially collapsed during formation of said V-shaped loop, and wherein said looper member is returned to its initial position during the initial portion of the subsequent feed stroke to thereby fully collapse said slack loop and enable the anchored end of said supply string to pull said supply string from said slack loop until said supply string reaches said string feeding means.

9. The machine of claim 6 wherein means are provided at said operating station to provide an index feature in said web in a constantly spaced relationship to said V-shaped loop.

10. The machine of claim 9 wherein means are provided for automatically adjusting the length of the feed stroke of the feed rolls in response to a signal engendered at least partially by said index feature.

11. A method of producing a spirally wound tube preparatory to cutting therefrom individual container bodies of predetermined length each having a spirally wound unitary label pattern and each being provided with a pull string disposed in a predetermined relationship to said label pattern, said method comprising the steps of feeding along a predetermined path a label web having said label patterns successively disposed thereon, feeding a body ply web along a second predetermined path converging with said path of the label web, securing individual pull strings longitudinally to said body ply web, applying a string index mark in the web at a predetermined position relative to the end of each string, applying a label index mark in a predetermined position on each of said label patterns, controlling the relative longitudinal positions of said body ply and label webs along their said paths in accordance with the relative positions of said string and label index marks to maintain accurate registry between each string and its label, and spirally winding said converged accurately registered webs and string to form them into an endless tube.

12. The method of claim 11 wherein said step of controlling the relative longitudinal positions of the webs includes the steps of comparing the positions of said label index marks with the positions of said string index marks to ascertain the relative positions of said label patterns and said pull strings, and correcting the position of subsequently secured pull strings when said comparison indicates a variation from registered position.

13. The method of forming individual pull strings in a web of material comprising the steps of feeding said web along a predetermined path of travel, bringing a longitudinally disposed supply string into proximity to one side of said web, cutting a longitudinal slit in said web adjacent and substantially parallel to said string, said slit being relatively long, substantially longer than twice the thickness of said string, and having its opposed edges normally substantially touching each other throughout their lengths immediately after said cutting step, drawing a relatively short length of said string through said slit and into a relatively wide and open loop on the other side of the web, the string portions at the opposite ends of the open loop being widely separated and forced into wedging and anchored engagement between said opposed edges of said longitudinal slit at opposite ends of the slit, cutting only said loop at a point between said anchored ends thereof, and repeating said steps to divide said string into a plurality of individual pull strings spaced along said web with each pull string having at least one relatively long free end projecting through a said slit and adapted to be grasped and pulled to tear through said web between said anchored ends of the string.

14. The method of claim 13 which incorporates the step of forming a continuous longitudinal shallow groove in the surface of said one side of said web substantially in alignment with said supply string, feeding said string into said groove, cutting said slit in the bottom of said groove, and depositing an adhesive material in said groove after said loop is formed on the other side of the web.

15. The method of claim 13 wherein said drawing step is effected with a needle having a hooked end and includes the step of passing the hook end of said needle through a mid point of said slit, engaging said string with said hook end, and drawing the string through said slit into a relatively wide V-shaped loop, said cutting step being effected on one leg of said V-shaped loop.

References Cited in the file of this patent

UNITED STATES PATENTS

| | | |
|---|---|---|
| 2,109,505 | Rue et al. | Mar. 1, 1938 |
| 2,405,909 | Smith et al. | Aug. 13, 1946 |
| 2,553,877 | Smith et al. | May 22, 1951 |
| 2,706,934 | Svenson | Apr. 26, 1955 |
| 2,734,432 | Robinson et al. | Feb. 14, 1956 |
| 2,794,761 | Williamson | June 4, 1957 |
| 2,897,729 | Ashton et al. | Aug. 4, 1959 |

FOREIGN PATENTS

| | | |
|---|---|---|
| 170,485 | Austria | Feb. 25, 1952 |
| 678,942 | Great Britain | Sept. 10, 1952 |